US006474145B1

(12) United States Patent
Fukuchi et al.

(10) Patent No.: US 6,474,145 B1
(45) Date of Patent: Nov. 5, 2002

(54) COMBUSTION STATE DETECTION SYSTEM FOR INTERNAL COMBUSTION ENGINE

(75) Inventors: Eisaku Fukuchi, Hitachi (JP); Akihito Numata, Ibaraki-ken (JP); Takanobu Ichihara, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/025,700

(22) Filed: Feb. 18, 1998

(30) Foreign Application Priority Data

Feb. 19, 1997 (JP) ............................................ 9-034975

(51) Int. Cl.[7] ............................................ G01M 15/00

(52) U.S. Cl. ........................................................ 73/116

(58) Field of Search ................................ 73/117.3, 116, 73/115; 123/406.42, 494, 417; 364/424.03

(56) References Cited

U.S. PATENT DOCUMENTS

| | | | | |
|---|---|---|---|---|
| 3,952,270 A | * | 4/1976 | Louvel | |
| 5,076,098 A | * | 12/1991 | Miwa | |
| 5,099,681 A | * | 3/1992 | Dils | 73/35 |
| 5,263,453 A | | 11/1993 | Wakahara et al. | |
| 5,331,934 A | * | 7/1994 | Asama et al. | 123/417 |
| 5,377,537 A | | 1/1995 | James | |
| 5,447,061 A | | 9/1995 | Fujiki | |
| 5,485,374 A | * | 1/1996 | Takaku et al. | 364/424.03 |

FOREIGN PATENT DOCUMENTS

| | | |
|---|---|---|
| DE | 42 02 407 A1 | 8/1993 |
| JP | 58 51243 | 3/1983 |
| JP | 7 19090 | 1/1995 |

* cited by examiner

*Primary Examiner*—Benjamin R. Fuller
*Assistant Examiner*—Octavia Davis
(74) *Attorney, Agent, or Firm*—Crowell & Moring LLP

(57) ABSTRACT

A combustion state detection system for an internal combustion engine, in which the engine combustion state is detected by the combustion state parameter calculated from a time signal associated with the rotation of the crankshaft by a predetermined angle. The system comprises a device for compensating for the combustion state parameter and a combustion state parameter compensating permitting condition determining device for permitting or inhibiting the execution of the combustion state parameter compensation device.

9 Claims, 7 Drawing Sheets

COMBUSTION STATE DETECTION SYSTEM FOR INTERNAL COMBUSTION ENGINE

CROSS-REFERENCE TO RELATED APPLICATION

The present application relates to subject matter described in co-pending application Ser. No. 08/966,359 filed on Nov. 7, 1997 entitled "Apparatus and Method of Detecting Combustion State of Internal Combustion Engine and Recording Medium Storing Program for Execution of the Detecting Method" by Eisaku Fukuchi and Akihito Numata, and assigned to the assignees of the present application, and to subject matter disclosed in co-pending application Ser. No. 08/704,368 filed on Aug. 28, 1996 entitled "Detector Device For Combustion State in Internal Combustion Engine" by Eisaku Fukuchi et al, and assigned to the assignees of the present application. The disclosures of those co-pending applications are incorporated therein by reference.

BACKGROUND OF THE INVENTION

The present invention relates to a combustion state detection system for an internal combustion engine (hereinafter sometimes referred to as "the engine"), or more in particular to a combustion state detection system for an engine capable of positively detecting a misfire occurring in an operation area resonating with the natural frequency of the vehicle body.

A conventional technique, as disclosed in Japanese Patent Application Publication No. JP-A-58-51243, is well known, in which the engine operating condition is detected by measuring the engine speed and detecting an engine misfire indirectly, taking advantage of the relation between the torque generated by the engine and the engine speed. In this conventional technique, the engine speed is detected at least at two ignition points within one ignition cycle from the previous ignition point to the current ignition point, the engine speed change in the ignition cycle is determined from the difference in engine speed, engine speed changes sequentially determined are statistically processed, and the engine combustion state is judged using the result of the processing.

The above-mentioned conventional technique is effective in the case of detecting a misfire when the engine is running at a comparatively low speed under a small load. In the case where the engine is running at a low speed under a heavy load, however, the speed change signal generated at the time of engine misfire resonates with the natural frequency of the vehicle body, thereby causing a secondary vibration. In the case where an overshoot of this secondary vibration signal exceeds a level of a misfire judgement, the engine is regarded to have caused a misfire, often causing a diagnosis error inconveniently.

On the other hand, Japanese Patent Application Publication No. JP-A-7-19090 discloses means for detecting the engine combustion state by measuring the engine speed taking advantage of the relation between the torque generated by engine combustion and the engine speed. This conventional technique also discloses a technique for protecting against variations in the engine speed signal not related to the change in the engine combustion state at low engine speed under heavy load leading to the resonance between the power train and the engine of the vehicle. This conventional technique is intended to inhibit a specific control (feedback control of the air-fuel ratio) in the case where the engine speed signal not related to the change in the engine combustion state undergoes a change, but discloses no technique for detecting the true change in the combustion state of the engine running at low speed under heavy load which may involve an engine speed signal not related to the change in the combustion state. The problem still remains to be solved, therefore, for detecting the engine combustion state at low speed under heavy load.

The present invention has been developed with the intention of solving the above-mentioned problem, and the object of the invention is to provide a combustion state detection system for an internal combustion engine, in which the combustion state in all the operating areas of the engine can be detected, and especially, the combustion state in the operating area where an engine speed change signal resonates with the vehicle vibrations and causes a secondary vibration is positively detected thereby to improve the detection accuracy of an engine misfire.

SUMMARY OF THE INVENTION

In order to achieve the above-mentioned object, according to one aspect of the invention, there is provided a combustion state detection system for an internal combustion engine, in which the engine combustion state is basically detected by combustion state parameters calculated from a timing signal associated with the rotation of the crankshaft by a predetermined angle, comprising means for compensating for the combustion state parameters and combustion state parameter compensation permitting condition determining means for permitting or inhibiting the execution by the combustion state parameter compensation means.

According to a specific preferable aspect of the invention, there is provided a combustion state detection system for an internal combustion engine, in which the combustion state parameter compensation means is a reverse model for offsetting the vibrations of the combustion state parameter generated by the resonance with the natural frequency of the vehicle body, in which the vibration model of the combustion state parameter is approximated to the transfer function of the secondary vibration system, in which the pole of the transfer function of the vehicle body vibration is offset at the zero point of the transfer function thereby to prevent the resonance of the combustion state parameter due to the vehicle body vibrations, and in which the combustion state parameter compensation means is a band-cut filter.

According to another aspect of the invention, there is provided a combustion state detection system for an internal combustion engine, in which the means for determining the conditions for permitting the combustion state parameter compensation determines such conditions from the operating condition parameters based on the function of the engine speed and the engine load.

According to still another aspect of the invention, there is provided a combustion state detection system for an internal combustion engine, further comprising a combustion state judging means for comparing the combustion state parameter with a specific decision level thereby to detector a misfire.

According to yet another aspect of the invention, there is provided a combustion state detection system for an internal combustion engine, further comprising a means for judging the conditions for permitting the combustion state parameter compensation, and a combustion state parameter compensation means, wherein whether the engine operating conditions are in an area of a low speed and a heavy load including an engine speed signal not related to the change in combustion state, and wherein the combustion state parameter can be compensated for in the case where the engine operating conditions are in such an area.

According to a further aspect of the invention, there is provided a combustion state detection system for an internal combustion engine, in which the vibration mode of the engine speed signal can be approximated to the secondary vibration system in a low-speed, heavy-load area where the engine speed signal resonates with the natural frequency of the vehicle body, and therefore the secondary vibration mode is offset for compensation, so that the true change in the engine combustion state of the internal combustion engine can be detected even in a low-speed, heavy-load area including the engine speed signal not related to the change in the engine combustion state.

Consequently, the combustion state parameter thus compensated is compared with a specific decision level by the combustion state judging means, thereby making it possible to detect an engine misfire in all the operating areas of the internal combustion engine.

DESCRIPTION OF THE PREFERRED EMBODIMENTS

An engine control system according to an embodiment of the present invention will be described below with reference to the accompanying drawings.

Figure 1:
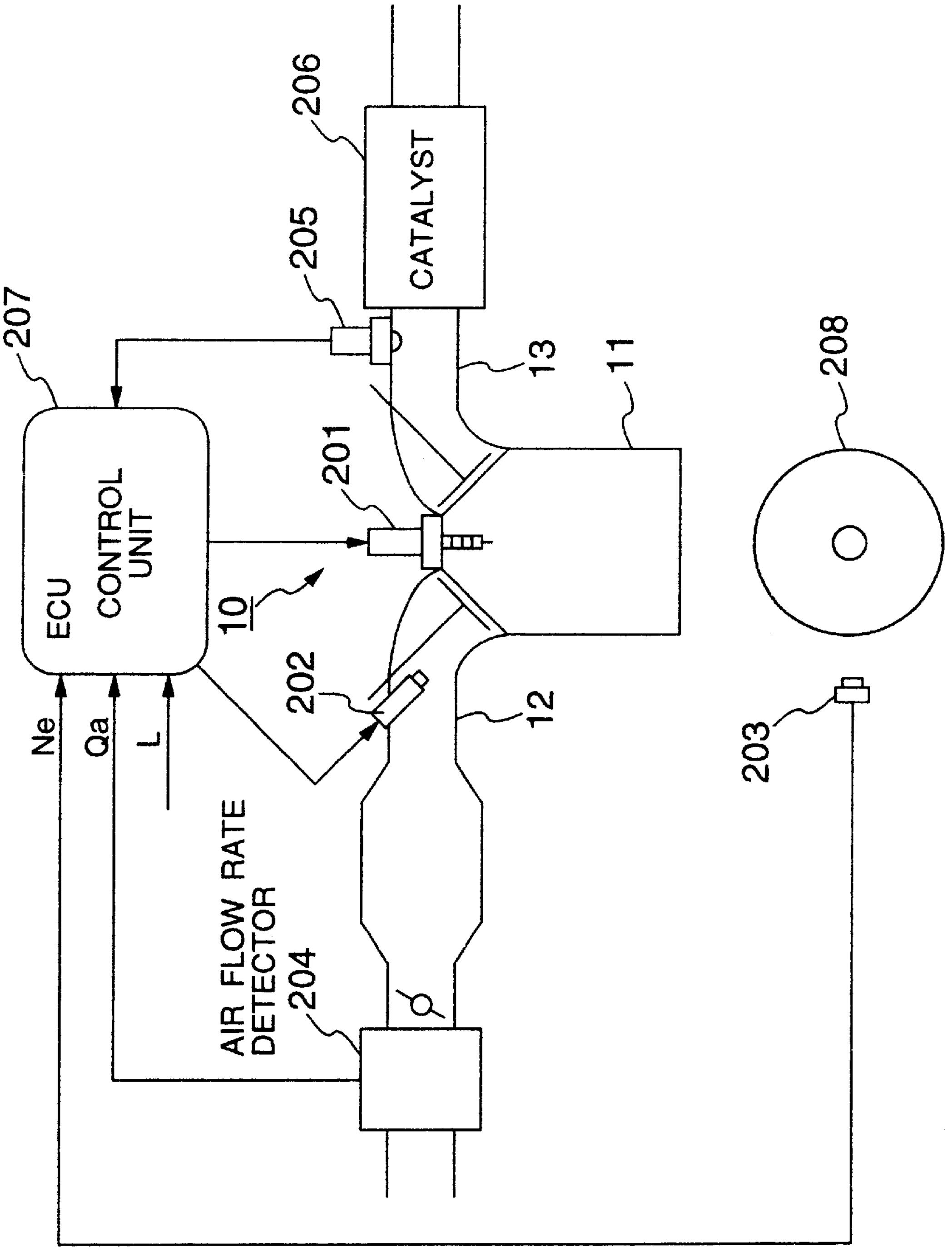
FIG. 1 is a diagram showing a general configuration of a combustion state detection system for an internal combustion engine according to an embodiment of the invention.

FIG. 1 shows a general configuration of a control system for an internal combustion engine 10 according to the invention.

The engine 10 has four cylinders with each cylinder 11 thereof connected with an intake pipe 12 and an exhaust pipe 13. An ignition unit 201 is mounted on the cylinder 11, and a fuel injection unit 202 is arranged on the intake pipe 12. An air cleaner (not shown) and a flow rate detection unit 204 are mounted upstream of the fuel injection unit 202. An air-fuel ratio sensor 205 and a three-way catalyst 206 are mounted on the exhaust pipe 13.

A control unit 207 for the engine 10 fetches an output signal Qa of the flow rate detection unit 204 and a rotational speed Ne of a ring gear or a plate 208 (engine) detected by an engine speed detection unit 203, calculates a fuel injection rate Ti based on the detected value of the rotational speed Ne and controls the injection rate of the fuel injection unit 202.

The engine control system 207 also performs what is called the feed-back control of the air-fuel ratio of the engine 10, in which the air-fuel ratio in the engine 10 is controlled to a stoichiometric value by correcting the fuel injection rate Ti based on the detection of the air-fuel ratio in the engine 10 by the air-fuel ratio sensor 205.

Figure 2:
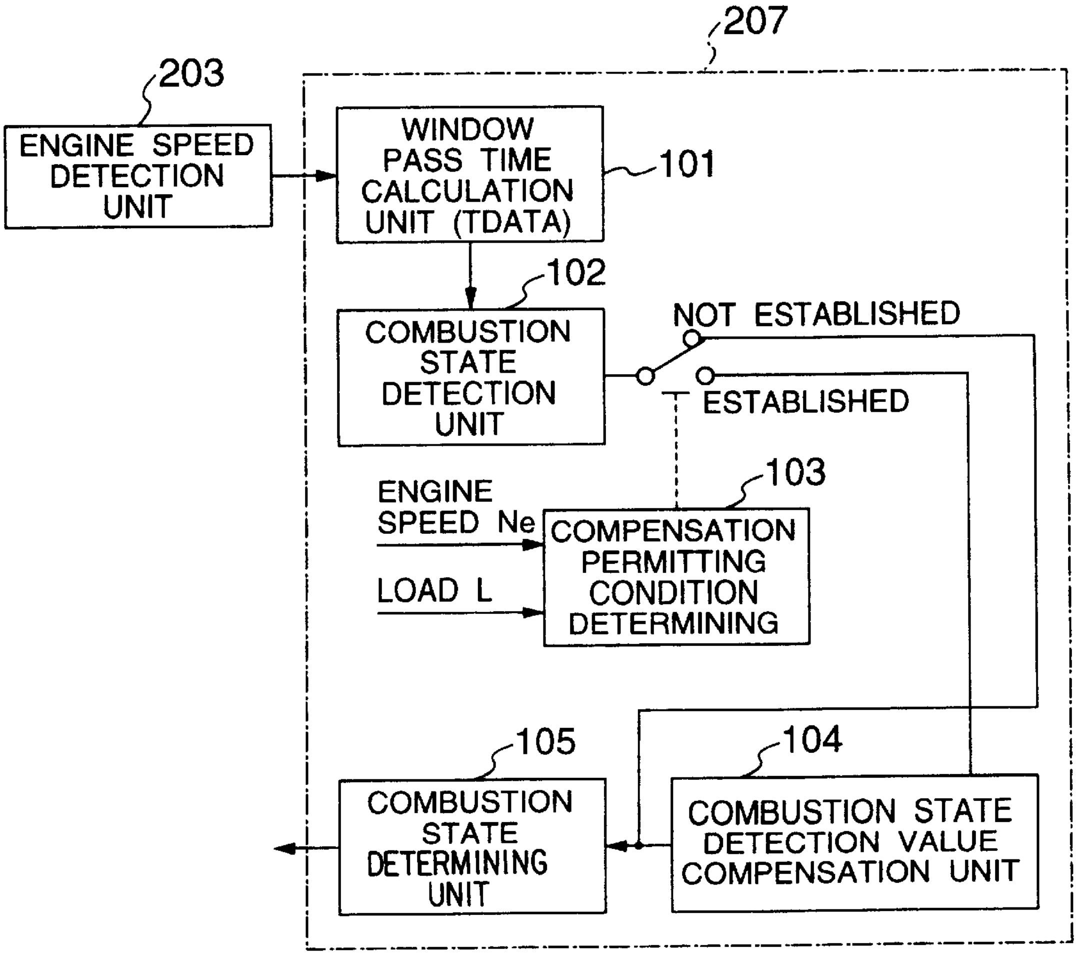
FIG. 2 is a block diagram for basic control of the combustion state detection system shown in FIG. 1.

FIG. 2 is a block diagram for basic control of the combustion state detection by the control unit 207 of the engine 10 according to this embodiment. In this control block diagram, the engine speed is detected by an engine speed rotational speed detection unit 203, and a window pass time calculation unit 101 detects the time (window pass time TDATA) required for the crankshaft to rotate by a predetermined angle based on the detected engine speed. A combustion state detection unit 102 calculates the combustion state detection value (combustion state parameter) based on the window pass time TDATA. A combustion state determining unit 105 judges the combustion state (occurrence or no-occurrence of a misfire according to this embodiment) from the combustion state detection value (combustion state parameter).

In the process, a compensation permit condition determining unit 103 decides whether or not to compensate for the waveform of the combustion state detection value (combustion state parameter) from the engine speed Ne and the engine load L. In the case where such a compensation is required, a combustion state detection value compensation unit 104 compensates for the combustion state detection value (combustion state parameter) and outputs it to the combustion state determining unit 105. In the case where judgement is that the waveform of the combustion state detection value (combustion state parameter) requires no compensation, in contrast, the combustion state detection value (combustion state parameter) from the combustion state detection unit 102 is output directly to the combustion state determining unit 105.

Figure 3:
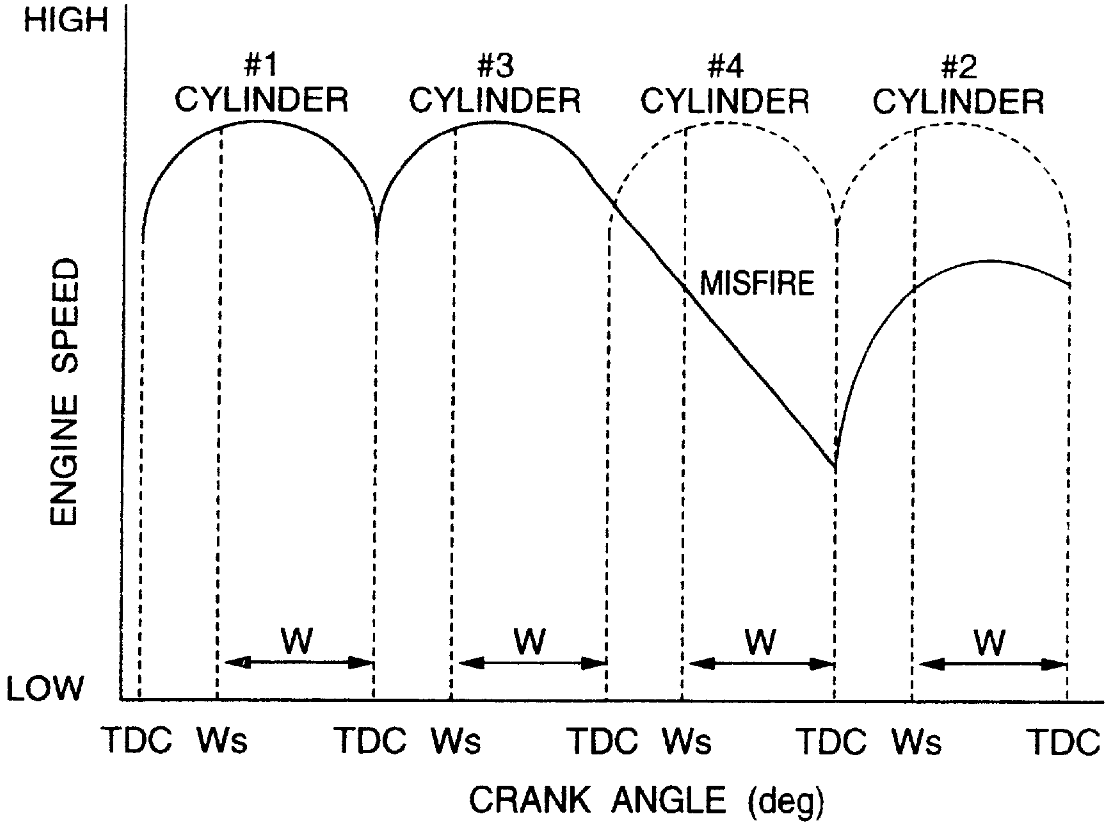
FIG. 3 is a diagram showing a change in engine speed in the case of an engine misfire.

FIG. 3 shows the engine speed with respect to the engine crank angle. The solid line represents a signal waveform produced when a misfire occurs in the fourth cylinder, and the dashed line represents a waveform of normal combustion state.

The section of engine speed measurement (called "the window" herein) for each cylinder shown in FIG. 3 will be explained.

The top dead center (TDC) of each cylinder is detected by a reference signal REF. A first crank angle is determined using an angular signal POS from TDC and determined as a window start point Ws. Similarly, a second crank angle is determined using the angular signal POS from the window start point Ws. The section from the first crank angle to the second crank angle is defined as a window width W.

Assume that the window pass time for a given cylinder in ignition cycle is expressed as TDATA(n), and that the combustion state parameter D1A is determined from equation (1).

$$D1A=(TDATA_{(n)}-TDATA_{(n-1)})/(TDATA_{(n-1)})^3 \qquad (1)$$

where $TDATA_{(n)}$ is the time when the cylinder in current ignition cycle passes the window W, $TDATA_{(n-1)}$ is the time when the cylinder in previous ignition cycle passes the window W, and D1A is a combustion state parameter.

Figure 4:
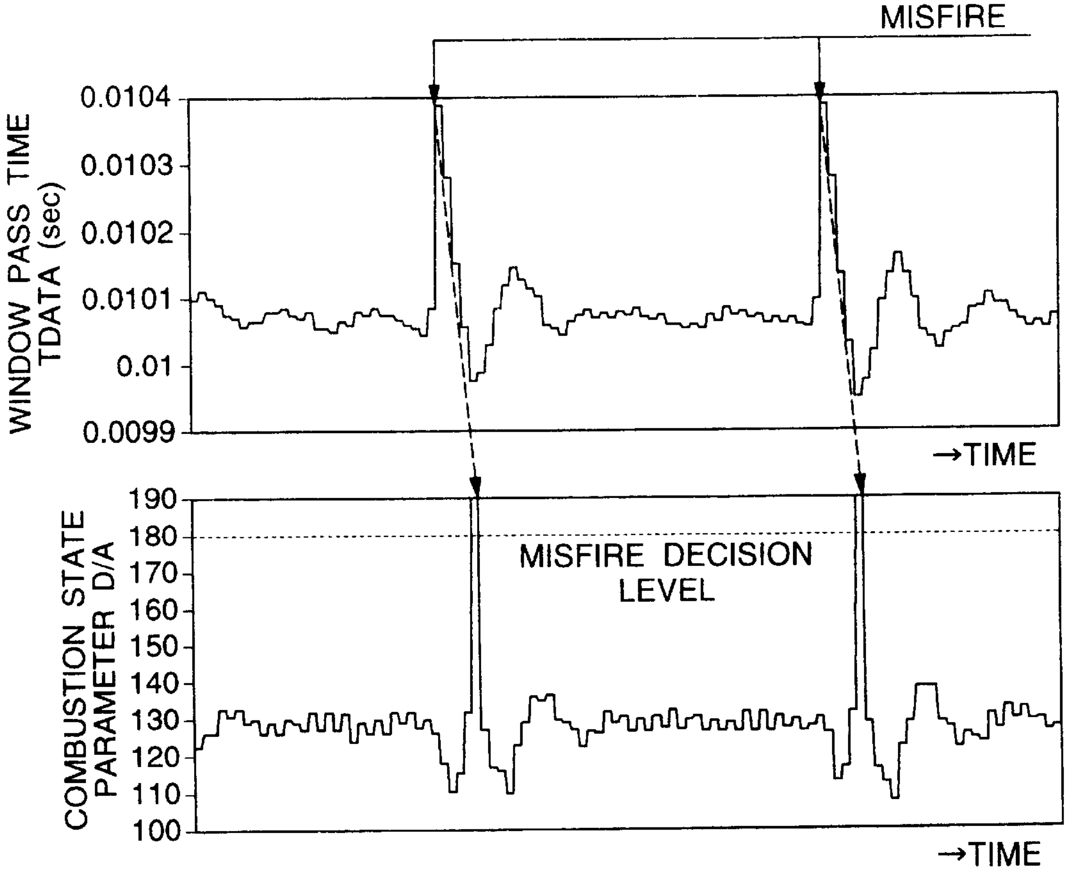
FIG. 4 is a diagram showing a window pass time TDATA and a combustion state parameter D1A at the time of an engine misfire.

In equation (1), the combustion state parameter D1A indicates zero when the combustion state of the engine 10 is normal and hence when the window pass time of each cylinder 11 is equal. In the case of a misfire of the engine 10, the torque of the misfired cylinder ceases to be generated and the engine speed decreases. Therefore, the TDATA value increases to such an extent that the combustion state parameter D1A comes to assume a certain positive value. The combustion state parameter D1A is compared with a preset value thereby to detect the presence or absence of a misfired cylinder (FIG. 4).

Figure 5:
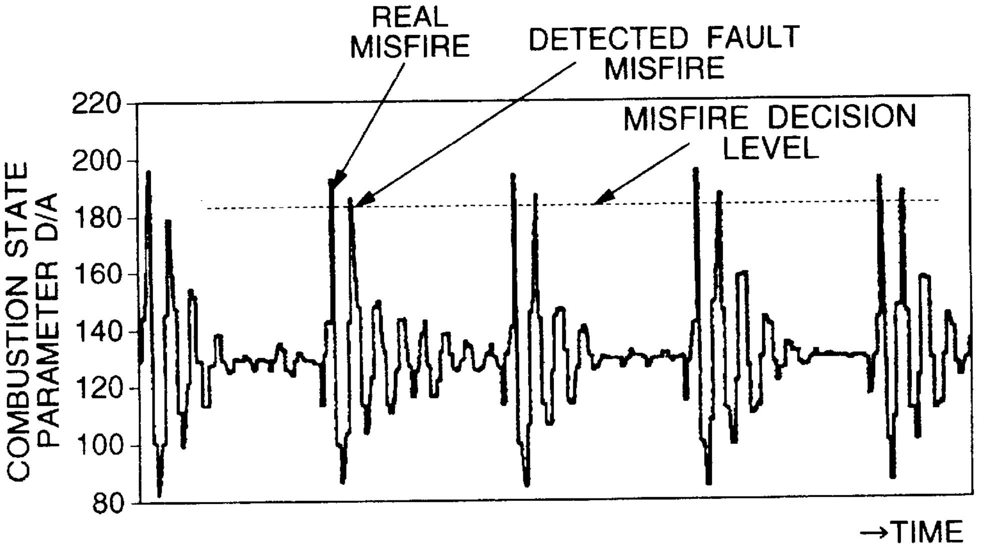
FIG. 5 is a diagram showing a combustion state parameter D1A in the secondary vibration area.

The above-mentioned system is effective for detecting a misfire of an engine running at a comparatively low speed under a comparatively small load. For the engine running at a low speed under a heavy load, however, the engine speed change signal generated at the time of a misfire resonates with the natural frequency of the vehicle body and causes a secondary vibration. In the case where the overshoot of the secondary vibration signal exceeds a misfire decision level, a misfire is considered to have occurred, sometimes causing a diagnosis error. This will be explained with reference to FIG. 5. In the case where the waveform of the combustion state parameter exceeds a misfire decision level, a real misfire is judged. In the area where the waveform of the combustion state parameter causes a secondary vibration, however, a signal is sometimes generated which exceeds the misfire decision level after an actual trigger misfire (a signal exceeding the misfire decision level). This signal is considered an overshoot due to the secondary vibration and therefore should not be counted as a misfire.

Figure 6:
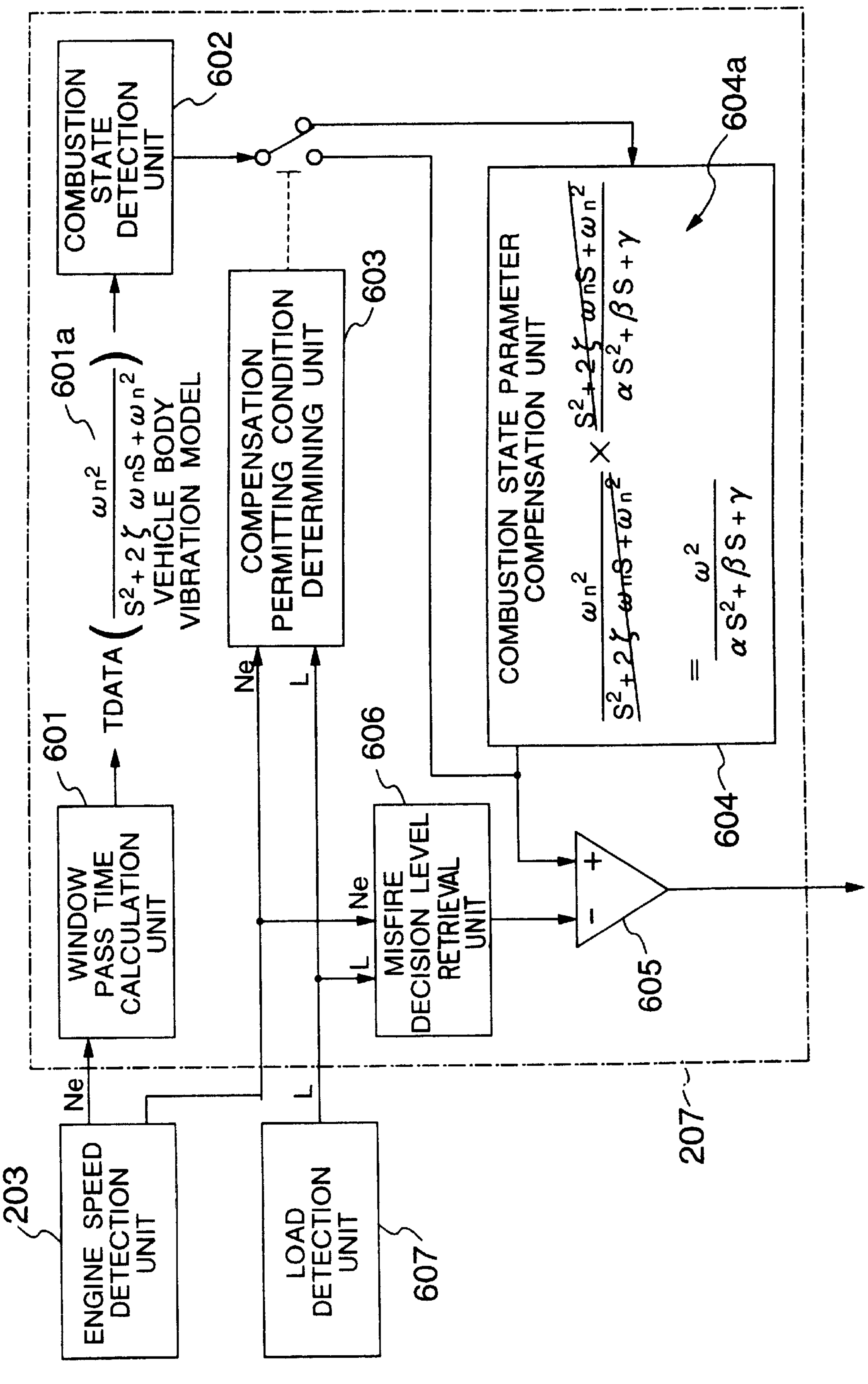
FIG. 6 is a specific control block diagram for suppressing the secondary vibration by the compensation means of the combustion state detection system shown in FIG. 1.

FIG. 6 is a block diagram for a specific control process in a combustion state detection system for an internal combustion engine according to this embodiment comprising a compensation means for suppressing the secondary vibration of the combustion state parameter. This compensation means is intended to suppress the secondary vibration of the combustion state parameter in an area (selectable from the engine speed and the load) where the secondary vibration of the combustion state parameter occurs.

In FIG. 6, the window pass timing signal TDATA calculated by a window pass time calculation unit 601 represents a transfer function with a gain of almost unity, but assumes a transfer function (vehicle vibration model) 601*a* for the secondary vibration system resonating with the natural frequency of the vehicle body when the engine is running at a low speed under a heavy load. The timing signal TDATA is applied to the combustion state detection unit 602 for calculating the combustion state parameter D1A from equation (1).

Assume that the compensation permit condition determining unit 603 judges an area causing a secondary vibration based on the engine speed Ne and the load L measured by the engine speed detection unit 203 and the load detection unit 607, respectively. The signal from the unit 603 is applied to a combustion state parameter compensation unit (compensator) 604 for offsetting the transfer function via window pass time calculation unit 601 for the purpose of compensation. Specifically, the combustion state parameter is compensated in such a manner that the pole (the value S determined when the denominator is zero) of the transfer function 601*a* during the vehicle body vibration is offset by the zero point (the value S determined when the numerator is zero) of the transfer function 604*a* of the compensation unit (compensator) 604.

According to this embodiment, the vehicle body vibration model $\zeta$ is set to 0.09, $\omega n$ to 11 [rad/s], and $\alpha$ to 0.01, $\beta$ to 0.1 and $\gamma$ to 1 for the compensator.

The combustion state parameter compensated for in the combustion state parameter compensation unit 604 is compared in the combustion state judging unit 605 with the misfire decision level retrieved from the map of the rotational speed Ne and the load L at the misfire level retrieving unit 606, and in the case where the combustion state parameter is larger than the misfire decision level, a misfire is judged.

Figure 7:
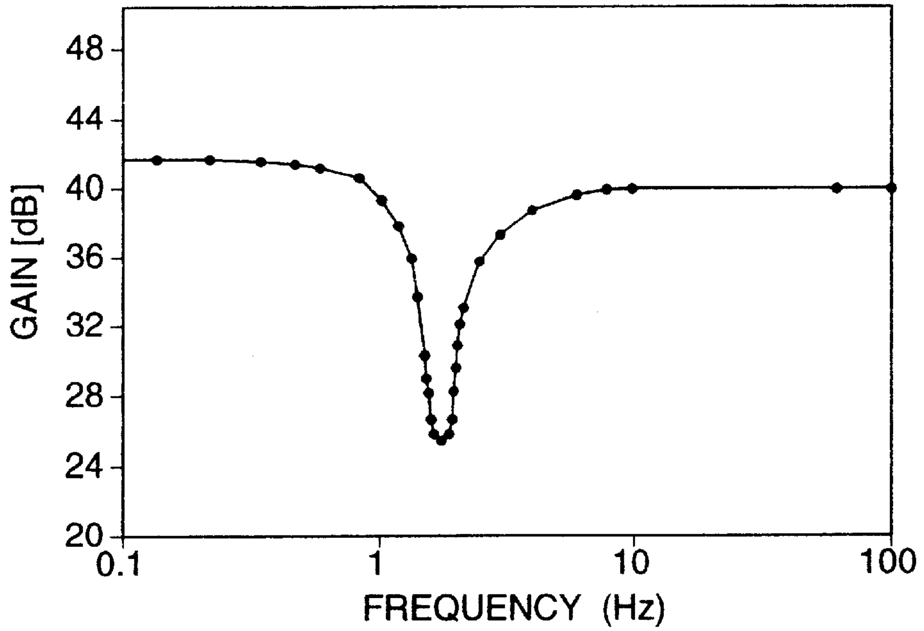
FIG. 7 is a diagram showing a frequency characteristic of the compensation means of the combustion state detection system shown in FIG. 1.

From another point of view, the compensation unit 604 can be considered as a kind of band cut filter. According to this embodiment, a frequency characteristic as shown in FIG. 7 is obtained. The control process is executed each time of ignition, and therefore it should be noted that the frequency is a function of the engine speed (f=Ne/120, where f is the frequency and Ne the engine speed).

Figure 8:
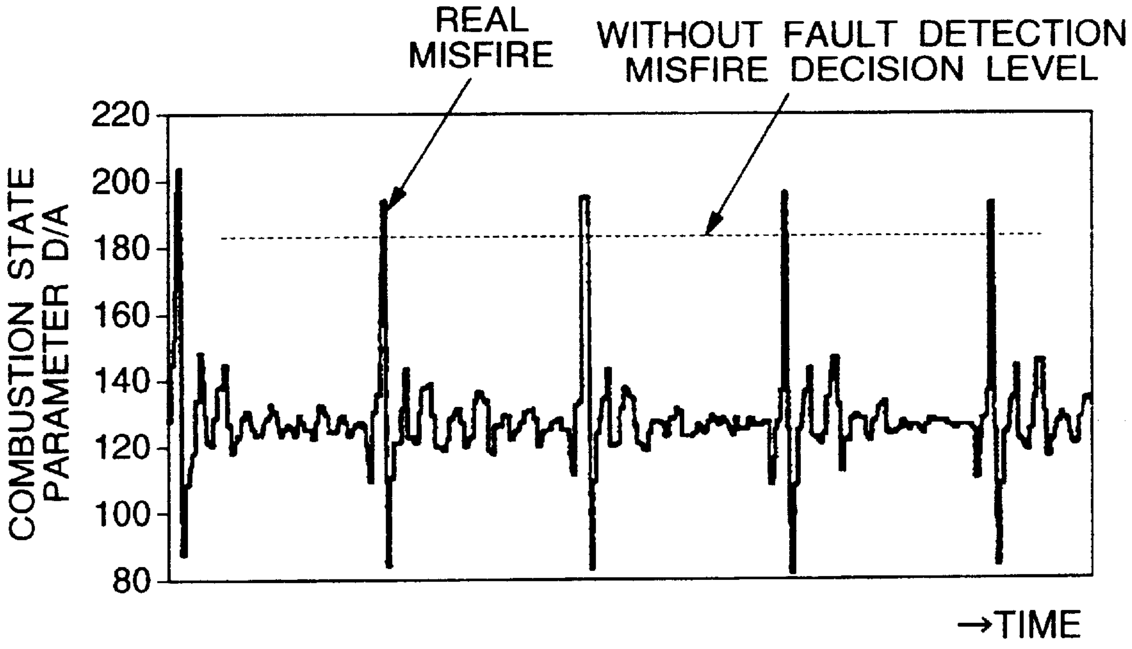
FIG. 8 is a state diagram of the combustion state parameter D1A with the secondary vibration suppressed by the compensation means.

FIG. 8 shows a combustion state parameter in the secondary vibration area compensated for by the combustion state parameter compensation unit 604. As will be understood by comparison with FIG. 5, there is generated no signal exceeding the misfire-decision level from and after an actual misfire signal (a signal exceeding the misfire-decision level) constituting a trigger, and thus an erroneous detection of a misfire can be prevented.

Figure 9:
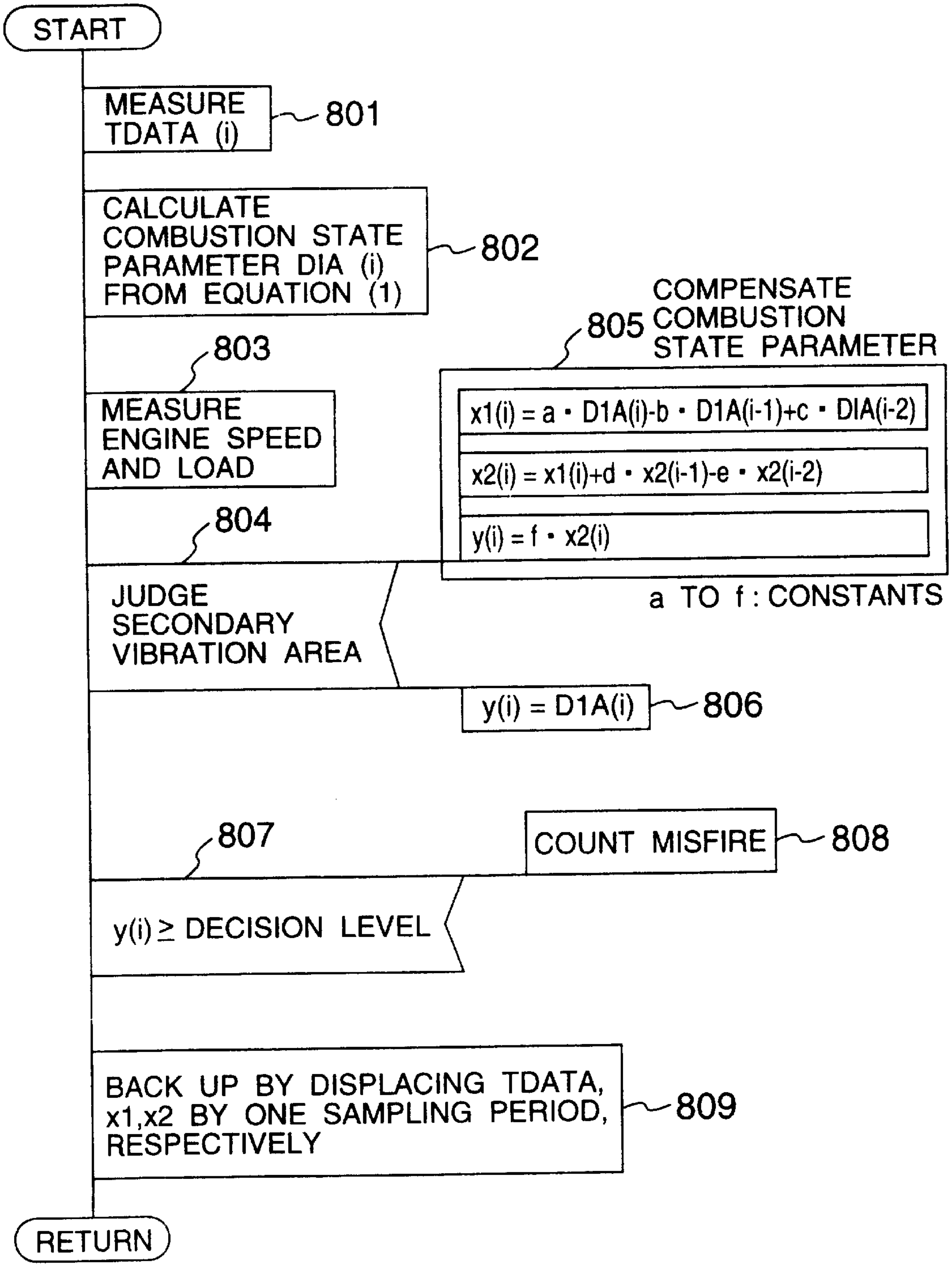
FIG. 9 is a control flowchart for a misfire diagnosis PAD of the combustion state detection system shown in FIG. 1.

FIG. 9 is a misfire diagnosis PAD diagram for the combustion state detection apparatus for an internal combustion engine according to this embodiment including the above-mentioned processing means, and shows a detection control flow.

This process is executed each time of ignition. In step 801, the window pass time TDATA is measured, and in step 802, the combustion state parameter D1A is calculated from equation (1). In step 803, the engine speed and the load are measured, and in step 804, whether the secondary vibration area is involved or not is judged from the engine speed and the load thus measured. In the case where the secondary vibration area is involved, step 805 compensates for the combustion state parameter D1A.

This compensation is processing the transfer function indicated by the combustion state parameter compensation unit 604, and a compensated combustion state parameter y is calculated by this process. According to this embodiment, the constant a is set to 80.143, the constant b to 79.714, the constant c to 68.714, the constant d to 0.85714, the constant e to 0.42857 and the constant f to 0.01428. In the case where the secondary vibration area is not involved, on the other hand, step 806 sets the combustion state parameter D1A as a compensated combustion state parameter y.

In the case where step 807 judges that the compensated combustion state parameter y is not less than the decision level, a misfire is judged and step 808 counts a misfire. Lastly, step 809 backs up by displacing TDATA, x1, x2 by one sampling period, respectively, for calculating the next combustion state parameter D1A.

An embodiment of the invention was described in detail above. The present invention, however, is not limited to the above-mentioned embodiment but can be modified variously in design without departing from the scope and spirit of the invention described in the claims.

It will thus be understood from the foregoing description that according to the present invention, there is provided a combustion state detection system for an internal combustion engine, in which the engine combustion state can be judged in all the operating areas of the internal combustion engine including a low-speed, heavy-load area which involves an engine speed signal not related to the change in combustion state.

Specifically, in the low-speed, heavy-load area where the engine speed signal resonates with the natural frequency of the vehicle body, the vibration mode can be approximated to the secondary vibration system. Therefore, the combustion state parameter is compensated in such a manner as to offset the secondary vibration mode. It is thus possible to detect the true change in the engine combustion state even in the low-speed, heavy-load area of the engine.

As a consequence, the compensated combustion state parameter is compared with a specific decision level by the combustion state judging means thereby to detect an engine misfire in all the operating areas.

What is claimed is:

1. A combustion state detection system for an internal combustion engine of a vehicle for detecting a combustion state of the internal combustion engine on the basis of at least a combustion state parameter calculated from a time signal associated with rotation of a crankshaft by a predetermined rotational angle, comprising:

compensating means for compensating said combustion state parameter, said compensating means including a model for canceling a vibration of the combustion state parameter due to resonance with an inherent vibration frequency of a body of the vehicle; and combustion state parameter compensation permitting condition determining means for permitting or inhibiting functioning of said compensating means for said combustion state parameter.

2. A combustion state detection system for an internal combustion engine according to claim 1, wherein said model approximates a vibration model of said combustion state parameter in response to a transfer function of a secondary vibration system, thereby to prevent said combustion state parameter from resonance due to vibration of the vehicle body.

3. A combustion state detection system for an internal combustion engine according to claim 1 wherein said combustion state parameter compensation means approximates said model of said combustion state parameter to a transfer function of a secondary vibration system, and offsets a pole of a vehicle body vibration transfer function at a zero point thereof, thereby preventing said combustion state parameter from resonance due to vibration of the vehicle body.

4. A combustion state detection system for an internal combustion engine according to claim 1, wherein said combustion state parameter compensation means is a band-cut filter.

5. A combustion state detection system for an internal combustion engine according to claim 1, wherein said combustion state parameter compensation permitting condition determining means determines said permitting condition from an operating condition parameter.

6. A combustion state detection system for an internal combustion engine according to claim 1, wherein said combustion state parameter compensation permitting condition determining means determines said condition based on a function of engine speed and engine load.

7. A combustion state detection system for an internal combustion engine according to claim 1, further comprising combustion state judging means for comparing a combustion state parameter with a decision level thereby to detect a misfire.

8. The combustion state detection system according to claim 1, wherein said combustion state parameter compensation permitting means permits and inhibits functioning of the compensating means as a function of engine speed and load of said internal combustion engine.

9. The combustion state detection system according to claim 8, wherein said combustion state parameter compensation permitting means permits functioning of the compensating means when said internal combustion engine operates in an area of low speed and heavy load.

* * * * *